Patented Aug. 11, 1925.

1,549,062

UNITED STATES PATENT OFFICE.

NIELS C. CHRISTENSEN, OF SALT LAKE CITY, UTAH.

PROCESS OF TREATING ORES CONTAINING GALENA.

No Drawing.    Application filed December 26, 1923.    Serial No. 682,831.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Ores Containing Galena, of which the following is a specification.

This process relates to the treatment of ores containing galena for the recovery of the lead. It relates particularly to the processes of treatment described in my applications, Serial Nos. 327,400, 329,333, 372,691, and is an addition or improvement applicable to said processes. As described in my patent application cited above, galena may be dissolved in a slightly acid concentrated brine, made from the common chlorides, such as sodium chlorides, calcium chlorides, magnesium chlorides, etc., or a mixture of these. Either sulphuric or hydrochloric acid may be used, though the latter is preferable as with the former the solutions are contaminated with sulphates. The lead is dissolved as a chloride and the sulphur given off as $H_2S$ gas, as indicated in the following chemical equation:

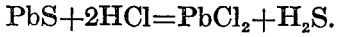

$$PbS + 2HCl = PbCl_2 + H_2S.$$

The galena may be dissolved in this way either in a hot or cold brine, the action being very rapid in the hot brine and much slower in the cold brine. The cold acid brine may be used in the treatment of complex lead zinc ores or concentrates containing both lead and zinc for the recovery of the lead therefrom in cases where it is desired to dissolve as little zinc as possible, as the cold solution is less active than the hot solution, though neither dissolve a great part of the zinc unless a considerable excess of acid above the minimum amount required to dissolve the lead is used. The hot brine dissolves a much higher percentage of $PbCl_2$ than the cold brine and a much smaller volume of brine may therefore be used to dissolve the lead in the hot brine and a large part of the lead may be recovered by cooling the brine. However, some of the lead cannot be precipitated by cooling and therefore in either case, using either a hot or cold brine, lead must be recovered by some other method of precipitation. Various methods have been proposed such as precipitation by electrolysis with insoluble anodes or with iron anodes precipitation with lime or calcium hydroxide and precipitation with metallic iron. None of these are entirely satisfactory, however, the electrolysis method requiring rather costly and extensive installation and being relatively expensive, the precipitation with lime giving a very bulky precipitate containing much orychloride of lead which is difficult to handle and to market or smelt, and the iron precipitation being inefficient and slow unless sponge iron is used, relatively expensive and contaminating the solutions to a degree with iron salts. By my new process I aim to overcome these objections and to secure the precipitation of the lead from the brine solutions very rapidly and completely, in a simple manner, wthout contaminating the brine solutions and at a relatively low cost. My method utilizes the $H_2S$ given off from the treatment of the galena in a simple and efficient manner. I have found that the lead cannot be satisfactorily precipitated from the brine with $H_2S$ alone as the presence of a very small amount of acid prevents the precipitation. However, if the $H_2S$ is used in the presence of calcium hydroxide or if the $H_2S$ is absorbed in lime or calcium hydroxide and this used for precipitation the lead may be completely precipitated from the brine as PbS with the formation of calcium chloride. The lime or calcium hydroxide may be first added to the solution, precipitating the lead as a hydroxide or a mixture of hydroxide and chloride and the $H_2S$ then passed into solution carrying this precipitate in suspension and converts this precipitate to the sulphide with the formation of calcium chloride as indicated below:

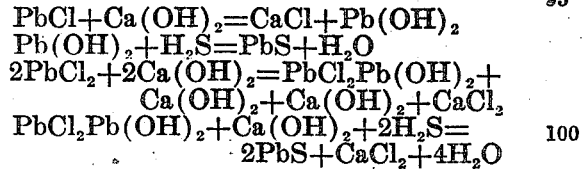

$$PbCl + Ca(OH)_2 = CaCl + Pb(OH)_2$$
$$Pb(OH)_2 + H_2S = PbS + H_2O$$
$$2PbCl_2 + 2Ca(OH)_2 = PbCl_2Pb(OH)_2 + Ca(OH)_2 + Ca(OH)_2 + CaCl_2$$
$$PbCl_2Pb(OH)_2 + Ca(OH)_2 + 2H_2S = 2PbS + CaCl_2 + 4H_2O$$

In most cases, however, I prefer to absorb the $H_2S$ in lime or calcium hydroxide in a suitable tower or other absorption apparatus to form calcium sulphide or calcium sulphhydrate and use these for the precipitation of the Pb as indicated below:

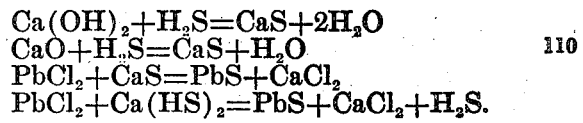

$$Ca(OH)_2 + H_2S = CaS + 2H_2O$$
$$CaO + H_2S = CaS + H_2O$$
$$PbCl_2 + CaS = PbS + CaCl_2$$
$$PbCl_2 + Ca(HS)_2 = PbS + CaCl_2 + H_2S.$$

As shown in the above chemical equations, if $Ca(HS)$ is used, twice as much $H_2S$ must be used to secure the precipitation of the PbS, but the use of the $Ca(SH)$ has the great advantage that this compound is soluble in water and may be used in a liquid. This also has the disadvantage of diluting the brine solution unless a barren brine is used to make the calcium sulphhydrate solution for precipitation. The CaS which is a solid is the least efficient as a precipitant as the precipitated PbS coats the particles of CaS immediately upon its addition to the solution and prevents completion of the reaction thus giving a low grade PbS precipitate.

The first method shown has a number of advantages over the others as noted below. If the exact equivalent of lime or calcium hydroxide needed to precipitate the lead is added to the brine in very finely divided form and the mixture is thoroughly agitated all the lime will go into solution as $CaCl$ and the lead will be precipitated as a hydroxide. If the $H_2S$ is then led into the solution the $Pb(OH)_2$ is converted to PbS with the formation of $H_2O$ as indicated above. This PbS precipitated is much more easily handled than the $Pb(OH)_2$ in settling, filtering and washing. The calcium hydroxide used in precipitation should be ground wet in a pebble mill in a barren brine to an unpalpably fine condition before being used as otherwise the particles are coated with the $Pb(OH)$ and the precipitate is contaminated with $Ca(OH)$. Where an especially clean precipitate of PbS is desired the $Ca(HS)$ should be used and the excess $H_2S$ be recovered and used again. In treating the galena ores with a cold acid brine the rapidity of solution is greatly increased by a thorough agitation of the pulp as this assists in freeing the $H_2S$ from the solution.

All classes of galena ores may be treated by this method to great advantage—particularly the mixed or complex lead, zinc, sulphate ores as by this method practically all the lead may be recovered from the ore without dissolving any appreciable amount of the zinc, this giving a lead free zinc product. Having described my process what I claim is new and desire to patent is:

1. The process of treating ores containing galena which consists in mixing said ores with an acid brine and thereby dissolving the lead as a chloride in said brine and driving off the sulphur as $H_2S$, and treating said $H_2S$ with lime to form a calcium sulphide and using said sulphide to precipitate the lead as a sulphide from above said brine.

2. The process of treating ores containing galena which consists in mixing said ores with an acid brine and thereby dissolving the lead as a chloride in said brine and driving off the sulphur as $H_2S$, and treating said $H_2S$ with lime to form a calcium sulphhydrate solution and using said sulphide solution to precipitate the lead as a sulphide.

3. The process of treating ores containing galena which consists in mixing said ores with a cold acid brine and thereby dissolving the lead as a chloride in said brine and driving off the sulphur as $H_2S$, and treating said $H_2S$ with lime to form a calcium sulphide and using said sulphide to precipitate the lead as sulphide from above said brine.

4. The process of treating ores containing galena which consists in mixing said ores with a cold acid brine and thereby dissolving the lead as a chloride in said brine and driving off the sulphur as $H_2S$, and treating said $H_2S$ with lime to form a calcium sulphhydrate solution and using said sulphide solution to precipitate the lead as a sulphide from above said brine.

NIELS C. CHRISTENSEN.